No. 683,166. Patented Sept. 24, 1901.
C. G. WOODHEAD.
PHOTOGRAPHIC SHUTTER.
(Application filed June 29, 1900.)
(No Model.)
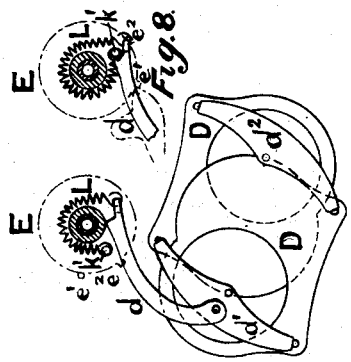
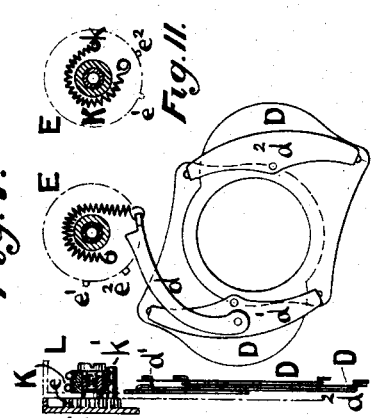
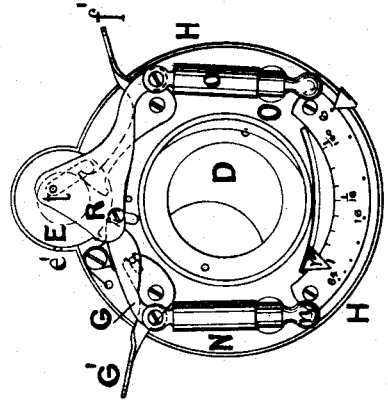
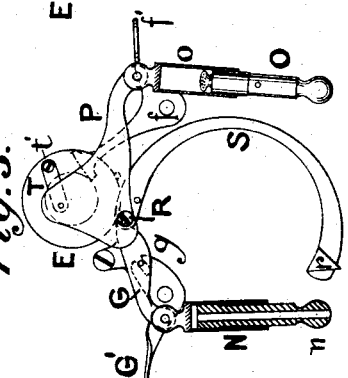
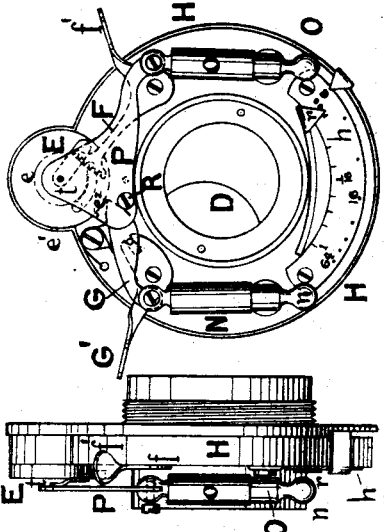
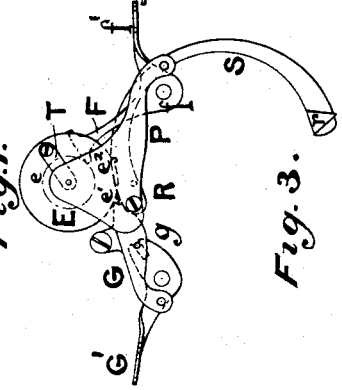
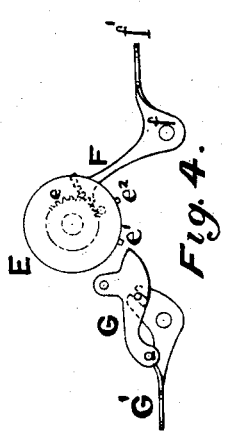
WITNESSES.
Joseph Bates.
C. W. Alexander.
INVENTOR
Chas G Woodhead
by I Dowden O'Brien
atty.

UNITED STATES PATENT OFFICE.

CHARLES GODFREY WOODHEAD, OF ALTRINGHAM, ENGLAND, ASSIGNOR TO THE THORNTON PICKARD MANUFACTURING COMPANY, LIMITED, OF SAME PLACE.

PHOTOGRAPHIC SHUTTER.

SPECIFICATION forming part of Letters Patent No. 683,166, dated September 24, 1901.

Application filed June 29, 1900. Serial No. 22,074. (No model.)

*To all whom it may concern:*

Be it known that I, CHARLES GODFREY WOODHEAD, a British subject, residing at Altringham, in the county of Chester, England, have invented certain new and useful Improvements in Photographic Shutters, of which the following is a specification.

This invention relates to the type of photographic shutter in which an iris-diaphragm and a shutter comprised of plates or blades are interposed between the members or glasses of the lens, and it is designed to construct these parts as thin as possible or to take up as little space laterally as possible, and also to improve the construction and arrangement of the parts, to simplify the construction, to render them more easy of manipulation, and less liable to get out of repair.

The invention will be fully described with reference to the accompanying drawings.

Figure 1 is a front elevation of the shutter, showing the position of the parts at rest and the shutter closed when set for the highest speed of travel and shortest exposure—say one one-hundredth of a second; Fig. 2, a side elevation of Figs. 1 and 5. Fig. 3 is a front elevation of the operative parts as in Fig. 1, showing the position of same when moved to set the shutter for exposure and in readiness for release. Fig. 4 is a front elevation of setting and releasing mechanism, showing position of the releasing-levers when depressed. Fig. 5 is a front elevation of the shutter, showing the position of the parts at rest and the shutter closed when set for the slowest speed of travel and longest exposure—say one second. Fig. 6 is a front elevation of the operative parts as in Fig. 5, showing position of same when moved to set the shutter for exposure and in readiness for release. Fig. 7 is a front elevation of the shutter-leaves and connecting-levers and spring when closed, as in Figs. 1 and 5. Fig. 8 is a front elevation of operating-spring, showing position taken by it when the shutter is set for exposure, as in Figs. 3 and 6, the leaves remaining closed, as in Fig. 7. Fig. 9 is a front elevation showing position of shutter-leaves when full open during exposure and connecting-lever and operating-spring. Fig. 10 is a side elevation, partly in section, of Figs. 9 and 11, showing revolving disk and also second spring. Fig. 11 is a front elevation, partly in section, showing position of second spring when set for exposure, as in Figs. 3, 6, and 8.

The operating-disk E, by which the shutter leaves or blades are actuated, has fitted to it a pinion $e$ and is rotated by a quadrant F, working on a pivot $f$ in the side of the case H. The quadrant F is provided with a lever or extension $f'$, by which it is moved upon its pivot $f$ to rotate the disk E. This lever $f'$ is so placed as to balance in appearance the auxiliary releasing-lever G', pivoted on the other side of the shutter. The operating-disk E is provided on its periphery with two pins or projections $e'$ $e^2$, with which the end of the releasing-lever G engages to hold it stationary when set.

To the operating-disk E are attached two springs K and L, (see Figs. 7 to 10,) one of which rotates it back to its position of rest and the other actuates the shutter-leaves D. The spring K at one end is attached to a fixed pin or stud $k$ in the casing H and at the other end to a stud or pin affixed to the disk E, so that when the disk is rotated by the quadrant F to set the shutter the spring is extended, as shown in Fig. 11. When the disk is released, the spring returns it to the position of rest. (See Figs. 1 and 5.) The second spring L is at one end attached to the lever $d$, which actuates the shutter-leaves D, and at the other to the pin or stud $k'$ on the operating-disk, so that when the disk E is rotated by the quadrant F to set the shutter the spring is extended and drawn into the position shown in Fig. 8, the shoulder on the end of the lever $d$ at the same time catching behind the pin $k'$.

The leaves D are hung upon the two pivoted leaves $d'$ $d^2$, the top of one leaf being pivoted to the top ends of both levers and the bottom of the other leaf pivoted to the bottom ends of both levers, thereby giving a simultaneous opposite and parallel movement to the two leaves D, forming the shutter. The lever $d$ is pivoted to the lever $d'$ and is drawn up or forward into the position shown in Fig. 7 by the spring L to close the aperture in the shutter-leaves D. The setting of the disk E draws the pin $k$ forward behind the shoulder or notch at the end of the lever $d$, and on the release of the disk E the lever $d$ is carried by the pin $k'$ into the position shown in Fig. 9, and the pin slides past the lever and is drawn back by the spring L into the position shown in Fig. 7, again closing the shutter.

The releasing-lever G is pivoted to the side of the case H, and its end engages the pin or perforation $e'$ on the periphery of the rotary operating-disk E to hold it when the shutter is set and with the pin $e^2$. When it is desired to arrest the travel of the shutter-blades and hold them open for any required length of time, it is moved by the pneumatic plunger N, to the end of which at $n$ a tube is attached. The releasing-lever G may also be moved by the auxiliary lever G', one end of which engages with the pin $g$. The speed of movement of the shutter leaves or blades D is controlled by a pneumatic plunger O and casing $o$, which are connected to the rotating operating-disk E. The lever P, by which the pneumatic timing device O is connected to the disk E, is pivoted upon a movable fulcrum R, carried at one end of the pivoted lever S, which can be readily moved to change the position of the pivot or fulcrum R of the lever P. The connecting-lever P is connected by a short link T with the rotating setting or operating disk E, the link T being pivoted to the lever P by a pin or pivot $t$ and to the disk by a pin or pivot $t'$. When set in position to work the shutter at its fastest speed, the fulcrum R is so placed that the pivot $t$, by which the link T is attached to the connecting-lever P, is coincident or concentric with the center of the disk E, so that the rotary movement of the disk does not move the lever. The alteration or raising of the fulcrum R by the movement of the pivoted lever S lifts the pivot $t$ eccentric to the disk E, whereby the rotation of the disk during setting draws the end of the lever P, connected to the pneumatic timer O, away from it, from the position shown in Fig. 5 to that shown in Fig. 6, thereby lengthening the travel of the pneumatic case $o$ over the plunger, consequently correspondingly retarding the rotation of the disk E and the closing movement of the shutter-leaves D, thereby lengthening the time of exposure. When the disk E is working slowly, the releasing-lever G engages the second pin or stop $e^2$ on the periphery when the aperture in the shutter-leaves is wide open and may be so retained for a time exposure for any desired length of time, the shutter closing when the releasing-lever is a second time operated.

The lever S, carrying the movable fulcrum R, is provided with an index-finger $r$ at the opposite end, moving in a slot $s$ in the casing H over an index-plate $h$, affixed thereto. By moving the free end of the lever with the finger $r$ the position of the fulcrum R is changed and the speed of exposure adjusted.

What I claim as my invention, and desire to protect by Letters Patent, is—

1. In a photographic shutter, the combination with the shutter-leaves D and the rotating disk E for operating the same, of the pinion $e$ attached to the disk, the pivoted quadrant F for rotating the same, and the pivoted lever G to release the disk, substantially as described.

2. In a photographic shutter, the combination with the shutter-leaves D, the supporting-levers $d'$ $d^2$, the connecting-lever $d$, the springs L and K and rotary disk E, of the pneumatic timer O, the lever P connected to the disk E and pivoted upon a movable adjustable fulcrum R, the pivoted lever S carrying the fulcrum R at one end and the index-pointer $r$ at the other, and the link T attached to the connecting-lever P and to the disk E, substantially as described.

3. In a photographic shutter, the combination with two shutter-leaves D of the rotary operating-disk E, the two springs K and L to actuate the movable parts, the pin $e$ attached to the disk, the quadrant F to set the disk, the lever G to engage the projections $e'$ $e^2$ on the periphery of the disk, the pneumatic timing device O connected to the disk, the connecting-lever P mounted upon a movable fulcrum, the lever S carrying the movable fulcrum at one end, and the link T pivoted at $t$ $t'$, by which the connecting-lever P is attached to the rotary disk E, substantially as described.

4. The combination with a rotary disk for operating the shutter, of the pneumatic timer O connected to the disk by a lever P mounted upon a movable fulcrum, the connecting-lever P, a lever carrying the movable fulcrum, and the link T pivoted to the lever P and to the disk, substantially as described.

In witness whereof I have hereunto signed my name, in the presence of two subscribing witnesses, this 19th day of June, 1900.

CHARLES GODFREY WOODHEAD.

Witnesses:
J. OWDEN O'BRIEN,
B. TATHAM WOODHEAD.